United States Patent [19]

Martin et al.

[11] 3,750,110

[45] July 31, 1973

[54] DATA TRANSFER SYSTEMS

[75] Inventors: John Terry Martin, Crowthorne; John Elstow Remmington, Workingham; John Bedford, Reading, all of England

[73] Assignee: Ferranti Limited, Hollinwood, Lancashire, England

[22] Filed: Nov. 24, 1971

[21] Appl. No.: 201,745

[52] U.S. Cl. .......... 340/172.5

[51] Int. Cl. .......... G06f 3/04

[58] Field of Search .......... 340/172.5, 146.1 C, 340/146.1 BE; 235/153

[56] References Cited

UNITED STATES PATENTS

| | | | |
|---|---|---|---|
| 3,593,302 | 7/1971 | Saito | 340/172.5 |
| 3,680,053 | 7/1972 | Cotton | 340/172.5 |
| 3,252,138 | 5/1966 | Young | 340/146.1 C |
| 3,476,922 | 11/1969 | Yiotis | 235/153 |
| 3,501,743 | 3/1970 | Dryden | 340/146.1 BE |
| 3,644,901 | 2/1972 | Zingg | 340/172.5 |
| 3,623,014 | 11/1971 | Doelz | 340/172.5 |

*Primary Examiner*—Paul J. Henon
*Assistant Examiner*—Sydney R. Chirlin
*Attorney*—Edward J. Kondracki

[57] ABSTRACT

A data transfer system has a plurality of peripheral units each of which may be required to receive data from, or transmit data to, another such unit. Each peripheral unit is connected to each of at least two data highways, and each highway is provided with its own highway controller, which operates to send a sequence of control instructions over the highway. Means are provided at each peripheral unit for checking the received control instructions against one another, and for acting upon the selected instruction. Data source peripheral units are arranged to send the selected instruction back over the highways to maintain the highway controllers in synchronism with one another.

19 Claims, 6 Drawing Figures

DATA TRANSFER SYSTEMS

This invention relates to data transfer systems.

Data transfer systems are known in which a plurality of peripheral units is connected to a common highway in such a manner that any one of the units may transmit data to any other receiving unit or units. It is usual for such a system to be controlled by a controller which issues control instructions one at a time to cause the designated transmitting peripheral unit to transmit data to the designated receiving unit or units. The main disadvantage of such a system is that any failure of the highway or of the controller causes the entire system to fail. Such a system is also sensitive to noise, which may cause a control instruction to contain an error. Although the former disadvantages may be overcome to a certain extent by duplicating the highway and the controller, the latter problem is not avoided by this means.

It is an object of the present invention to provide a data transfer system of the type referred to above, which has a high order of reliability and noise immunity.

According to the present invention there is provided a data transfer system having a plurality of peripheral units any one of which may be required to transmit data to or receive data from other such units, which includes at least two independent data highways, a separate controller for each highway operable to transmit over its highway a sequence of control instructions identical to the sequence transmitted by each other controller, synchronising means included in each controller for maintaining its sequence of control instructions in synchronism with the sequence transmitted by each other controller, separate connections between each highway and each peripheral unit, and checking means included in each peripheral unit operable to check each received control instruction and to cause the unit to act only upon predetermined ones of the instructions.

An embodiment of the invention will now be described with reference to the accompanying drawings, in which.

Figure 1:
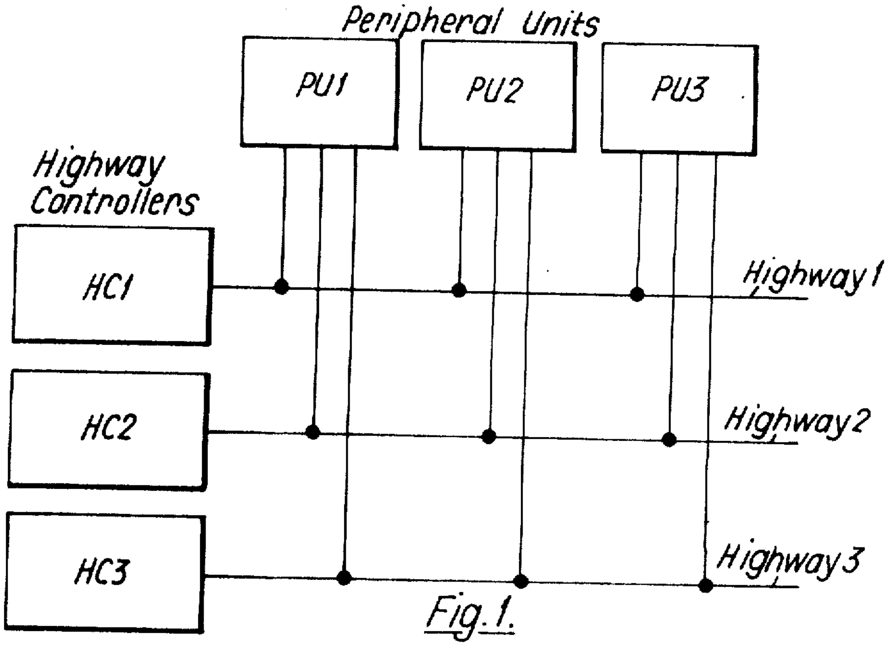
FIG. 1 is a block schematic diagram of a system having three highways.

FIG. 1 illustrates in schematic form the system under consideration. Three completely independent highways H1, H2 and H3 are shown, each being controlled by its own highway controller HC1, HC2 and HC3 respectively. Three peripheral units PU1, PU2 and PU3 are shown, though there will usually be many more than this. Each peripheral unit has a separate connection to each highway. The highways, and their connections to the peripheral units are capable of passing data in either direction, though not in both directions simultaneously. Each controller generates the same sequence of control instructions under the control of its own clock pulse generator. The sequence need not be symmetrical, indeed it will frequently be the case that some instructions are required to be repeated more often than others. The controllers are completely independent of one another, that is there is no master-slave relationship.

The peripheral units may take a variety of forms, depending upon the application of the system. For example, in an aircraft flight-aid system it is necessary to feed into a computer signals derived from various sensors. Signals from the computer are, in their turn, applied to transducers to provide the necessary control. Hence the sensors are peripheral units which only transmit data, the transducers are peripheral units which only receive data and the computer both transmits and receives data. The sequence control instructions determines the sequence of operation of the various peripheral units.

Figure 2:
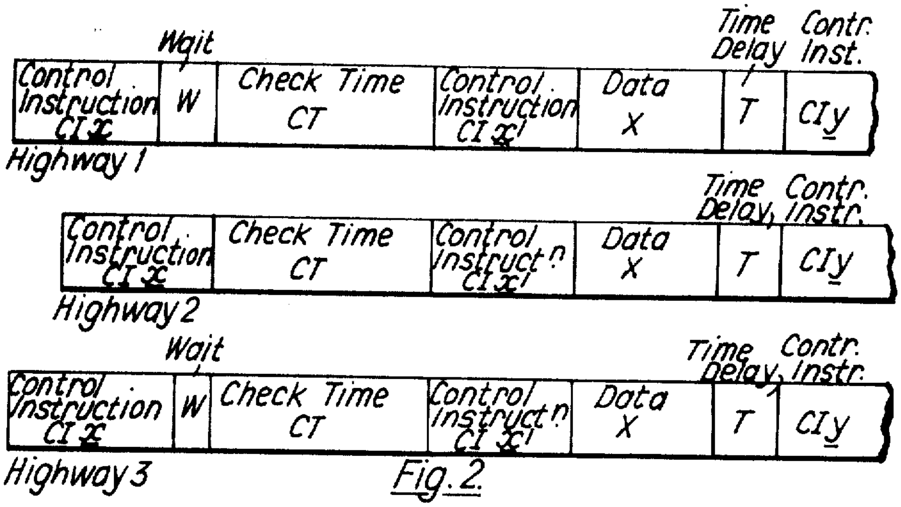
FIG. 2 illustrates the sequence of data flow on each highway.

FIG. 2 illustrates part of a sequence of control instructions, assuming that the three controllers are initially almost in synchronism. Referring to FIG. 2, each controller generates a control instruction CI*x*. The instruction which is generated first, shown at the top of FIG. 2, activates the various peripheral units which have to either transmit or receive data. Each peripheral unit waits for a time W after the earliest instruction has been received on one of the highways to allow for the others to arrive, and then performs checks on the three instructions during the time interval CT. The instruction is then acted upon if accepted and the quantity X is transmitted by the source unit over all three highways to the receiving units. Immediately before the data is transmitted, the source unit sends back the control instruction as CI*x*', which synchronises the three controllers. After a short time interval T the three controllers transmit the next control instruction CI*y*. Each bit of control instruction is accompanied by a clock pulse, which may be sent on a separate clock highway.

Figure 3:
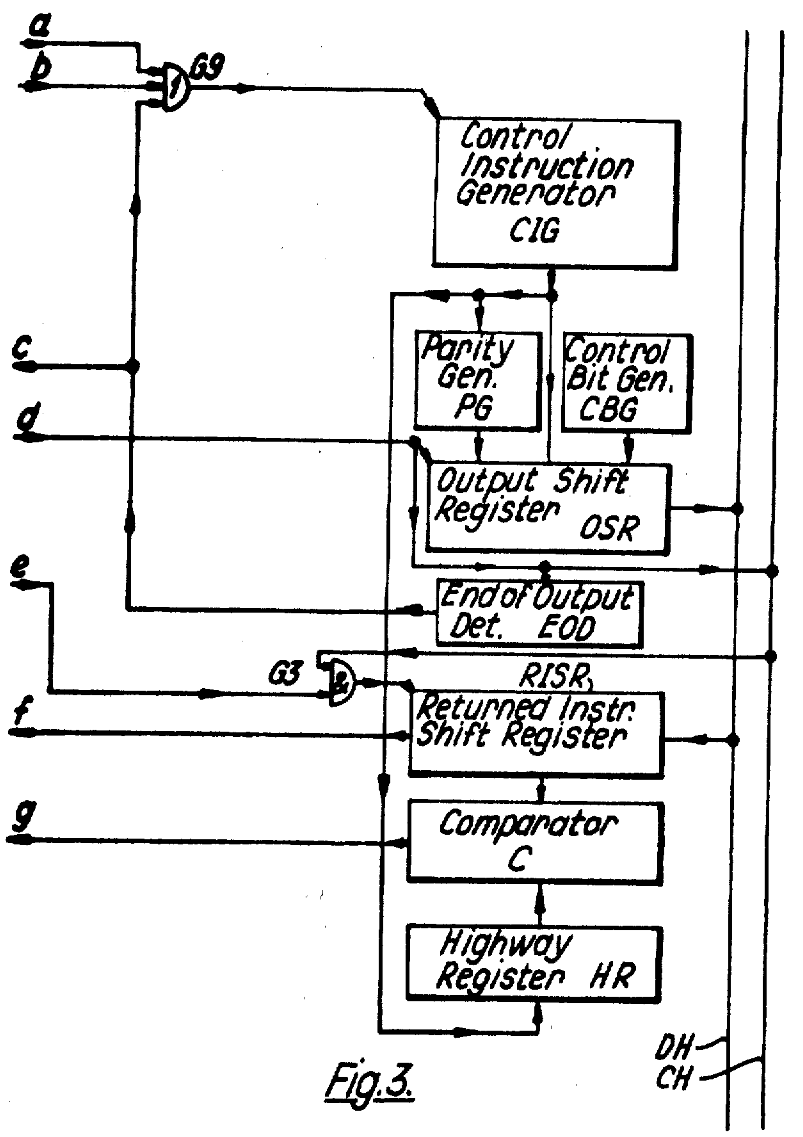
FIGS. 3 and 4 show a schematic diagram of a highway controller.
Figure 4:
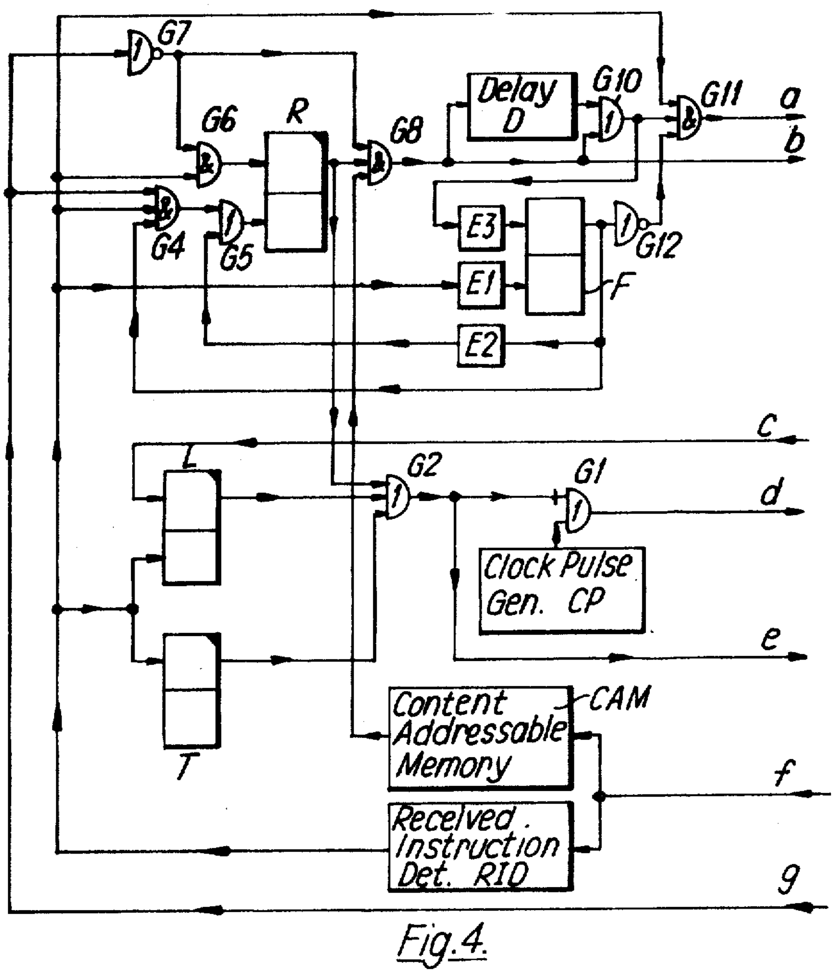

FIGS. 3 and 4 show a schematic diagram of a highway controller. Referring to these drawings the controller is built around a control instruction generator CIG (FIG. 3), which may for example be in the form of a read-only memory containing the full sequences of instructions which the controller is required to deliver. The generator CIG is of a type which may be indexed by an input so that an instruction is applied in parallel form to a highway, and may be strobed into one or more registers as and when required. FIGS. 3 and 4 show only data and control paths; the timing arrangements are not shown in detail. The output from the generator CIG is applied to a highway register HR and to an output shift register OSR. Since a parity check is required at a peripheral unit the output from the generator CIG also controls a parity bit generator PG which puts the necessary parity bit into the register OSR. Similarly validity and other control bits are suppled to OSR from a control bit generator CBG. The output shift register OSR is connected to the data highway DH controlled by this particular controller.

The application of control instructions from the register OSR to the data highway DH is controlled by clock pulses from a clock pulse generator CP. The output of the generator is connected via an inhibit gate G1 to both the output register OSR and the clock highway CH. Also receiving clock pulses is an end of output detector EOD having its output connected to one input of a three-input OR gate G9 which controls the indexing of the control instruction generator CIG. The output of detector EOD is also connected to the "set" input of a resettable monostable timing circuit L. The "set" output of monostable circuit L forms one of three inputs to OR gate G2, the output of which provides the inhibit input for gate G1. The output of gate G2 also forms one input of an AND gate G3, the other input being connected to the clock highway CH. The output of G3 forms the clock input to a returned signal input register RISR which has its data input connected to the data highway DH. The register RISR is connected to a comparator C, as is the highway register HR. The register RISR is also connected to a returned instruction detector RID and a content addressable memory CAM. The output of detector RID is connected to the "reset" input of monostable circuit L and to the "set" input of another monostable circuit T. The output of T forms a second input to OR gate G2.

The output from detector RID is connected through an edge-detecting circuit E1 to the "reset" input of a resettable monostable circuit F. The output of F is connected to one input of a three-input AND gate G4, the other two inputs being the outputs of detector RID and the comparator C. The output of gate G4 forms one input of OR gate G5, the other input being applied from an edge detector E2 to which is applied the output of monostable circuit F. The output of G5 is connected to the "reset" input of a further resettable monostable circuit R. The "set" input of monostable circuit R is derived from a two-input AND gate G6, one input of which is the output of detector RID. The other input of G6 is obtained by inverting the output of comparator C by means of an inverter gate G7. The output of monostable circuit R forms the remaining input to OR gate G2 and also one of three inputs to three-input AND gate G8. The other inputs to G8 are the output of memory CAM and the inverted comparator output from gate G7.

The output of gate G8 is applied as one input to each of two OR gates G9 and G10, and to a one-beat delay device D. The output of gate G9 forms the index input to the control instruction generator CIG, and the end of output detector EOD provides a second input to the gate. The output of the delay device D forms the second input of OR gate G10. The output of G10 is connected through an edge detector E3 to the "set" input of monostable circuit F, the output of which, as well as being connected as already described, is connected through an invertor gate G12 to three-input AND gate G11, together with the output of G10 and the RID signal.

The highway controller described above operates as follows:

The control instruction generator CIG passes an instruction via its output highway to the highway register HR and to the output shift register OSR. The latter register is also supplied with any required parity, validity and control bits from the parity generator PG and control bit generator CBG. If not inhibited by gate G1 the clock pulse generator CP delivers a train of clock pulses which cause the instruction stored in the register OSR to be put out serially onto the data highway DH. At the same time the clock pulse train is fed onto the clock highway CH. The end of the output to the highway is detected by the detector EOD which applies an index signal to the generator CIG via gate G9 and also sets the monostable device L to its unstable state. The output from the monostable device L passes through gate G2 and inhibits gate G1, thus preventing further clock pulses from being applied to the register OSR or clock highway CH whilst L remains set. The output from gate G2 is also applied to one input of AND gate G3.

The inhibiting of the clock pulses means that output register OSR containers the next instruction, together with its parity and control bits, but highway register HR still contains the first instruction. The second instruction is not applied to the register HR at this stage.

If the system as a whole is functioning correctly one of the peripheral units will return the instruction to the controller before the expiration of the time determined by monostable device L. The returning instruction is accompanied by a clock pulse train which operates gate G3 and enables the instruction to be read into returned instruction shift register RISR. The receipt of this returned instruction is detected by the returned instruction detector RID, the output of which resets monostable device L and sets monostable device T. The latter maintains the inhibit on the clock pulse gate G1 via gate G2. The returned instruction in register RISR and the original instruction in register HR are compared by the comparator C. If the two are in agreement the timing cycle of monostable device T is allowed to continue without further action. At the end of the time T the monostable device resets itself. This removes the inhibit input from gate G1, allowing the clock pulse train to send out the next instruction and shifting this next instruction into the highway register HR for the next comparison. This sequence of operations is maintained so long as the system is operating correctly.

If no returned control instruction is received during the time delay of monostable device L, the end of the delay period removes the inhibit input from gate G1 and the next control instruction is sent out over the data highway.

The time intervals L and T are identical in each controller in the system, and are of sufficient duration to allow any peripheral unit to take the necessary action. The time interval T is that shown in FIG. 2.

If an instruction received by the register RISR does not agree with that previously sent out and stored in the register HR, then the controller enters a "resynchronisation" mode in an attempt to find an instruction in the sequence of control instructions which agrees with that already received. As stated earlier, it is very likely that in the sequence of instructions some will occur more than once whilst others will be unique. These unique instructions may be used to resynchronise the controller. The content addressable memory CAM is used to identify these particular unique instructions in the cycle.

In the event of disagreement between transmitted and received signals the comparator C produces an output. If the received instruction is not of the unique class then although outputs will be obtained from detector RID and comparator C, there will be no output from memory CAM. As a result of this only gate G6 will operate, having the RID signal and the inverted comparator output via G7. This causes monostable device R to be set. The output from R, though applied to gate G8, does not cause that gate to operate since the Cam output is absent. The output from monostable device R this operates only gate G2, applying a further inhibit to the clock pulse gate G1 for the duration of the time delay of monostable device R. After this period the next instruction is sent out.

If the received instruction, on the other hand, is one of the unique class which causes an output from the memory CAM, then the full resynchronisation procedure is begun. In this case, in addition to monostable device R being set as described above, the gate G8 is allowed to function. The output from this gate passes through gate G9 and indexes the generator CIG. The instruction generator is thus caused to cycle at the maximum possible rate, each new instruction being read into both the registers OSR AND HR. The instructions in register OSR are not put onto the highway since the clock pulses are inhibited.

The instructions from the generator CIG are compared, one at a time, with that instruction held in register RISR. When agreeement occurs, the comparator output stops, so that there is no longer an output from gate G8. At the same time the set input to monostable circuit R via gate G6 also ceases and the timing period of R is started. The removal of the output from G8 removes the indexing input to gate G9 from gate G8. However, the one-beat delay device D provides a signal through gates G10 and G11 to gate G9 to index the generator CIG once more. The eventual removal of the output from gate G10 is detected by edge detector E3, and the monostable device F is set. This removes one input to gate G11. The next returned instruction is now awaited. If this agrees with the instruction stored in register HR, then the RID output causes monostable device F to be reset through edge detector E1, and causes monostable device T to be set, and monostable device R is reset via gate G4 due to the disappearance of the comparator output, thus removing one input from gate G2. The clock pulses are still inhibited, however, by the output from monostable device T. After the expiry of the timing period of T the clock inhibit is removed and normal operation is resumed.

If the latest comparison is not successful, then the output from comparator C re-appears, and the entire resynchronisation process is re-started.

If no further received instruction is received after monostable device F has started its timing cycle, then at the expiry of the timing period of F the monostable device R is reset via G5 due to the detection of the end of the F output by edge detector E2.

The worst case of lost synchronisation exists when the peripheral units are unable to sort out the instructions due to several completely different instructions being received. This situation may exist, for example, when the system is switched on initially. In this case no instructions are sent back to the controllers, and the cycle of instructions is sent out by each controller. At some time, however, due to drift between the clock pulse generators of each controller, one instruction will be received by an addressed peripheral unit to the exclusion of the other controllers. This instruction will then be returned and cause the resynchronisation procedure to start as described above.

The synchronising means described above is only one of the ways in which the resynchronisation may be achieved.

Figure 5:
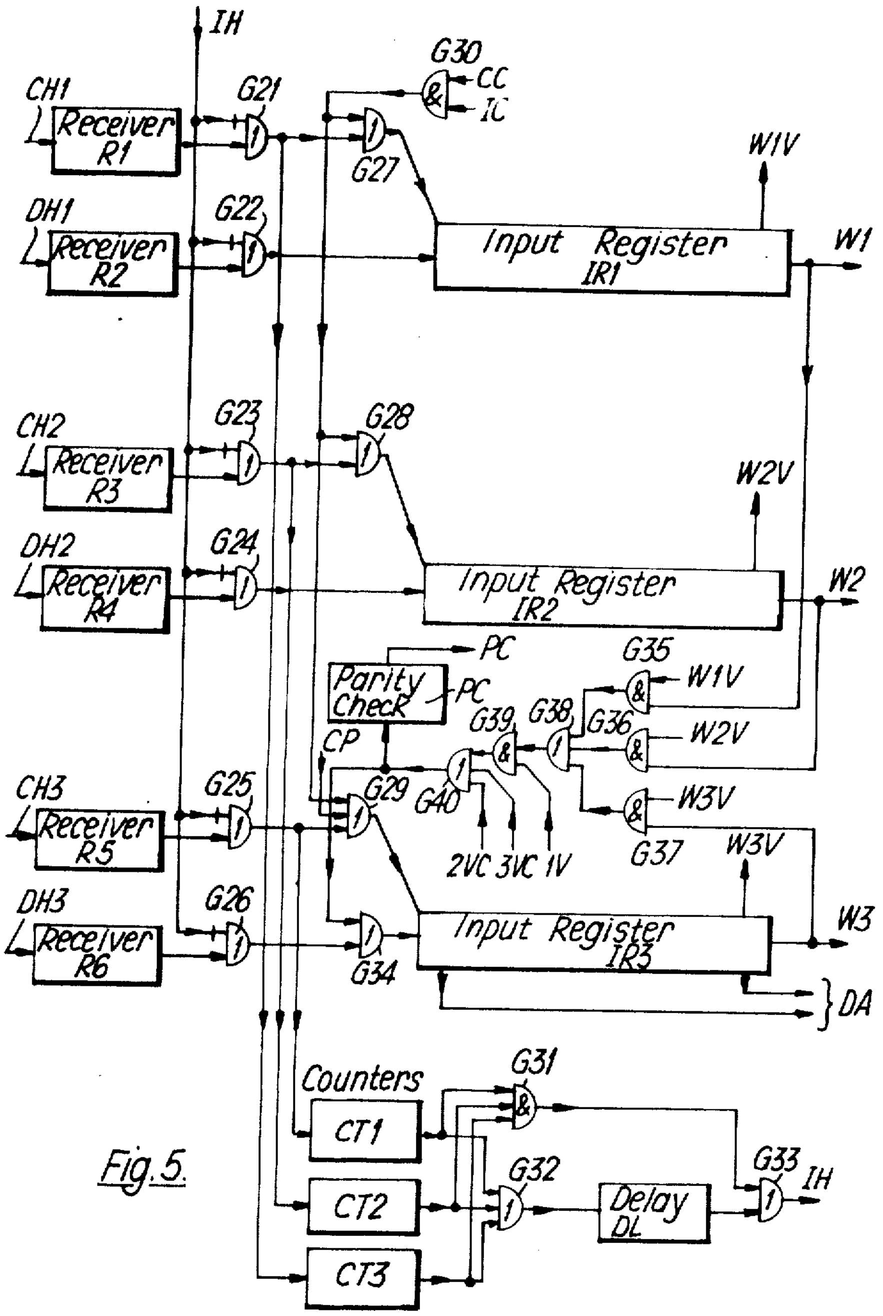
FIGS. 5 and 6 show a block diagram of a peripheral unit.
Figure 6:
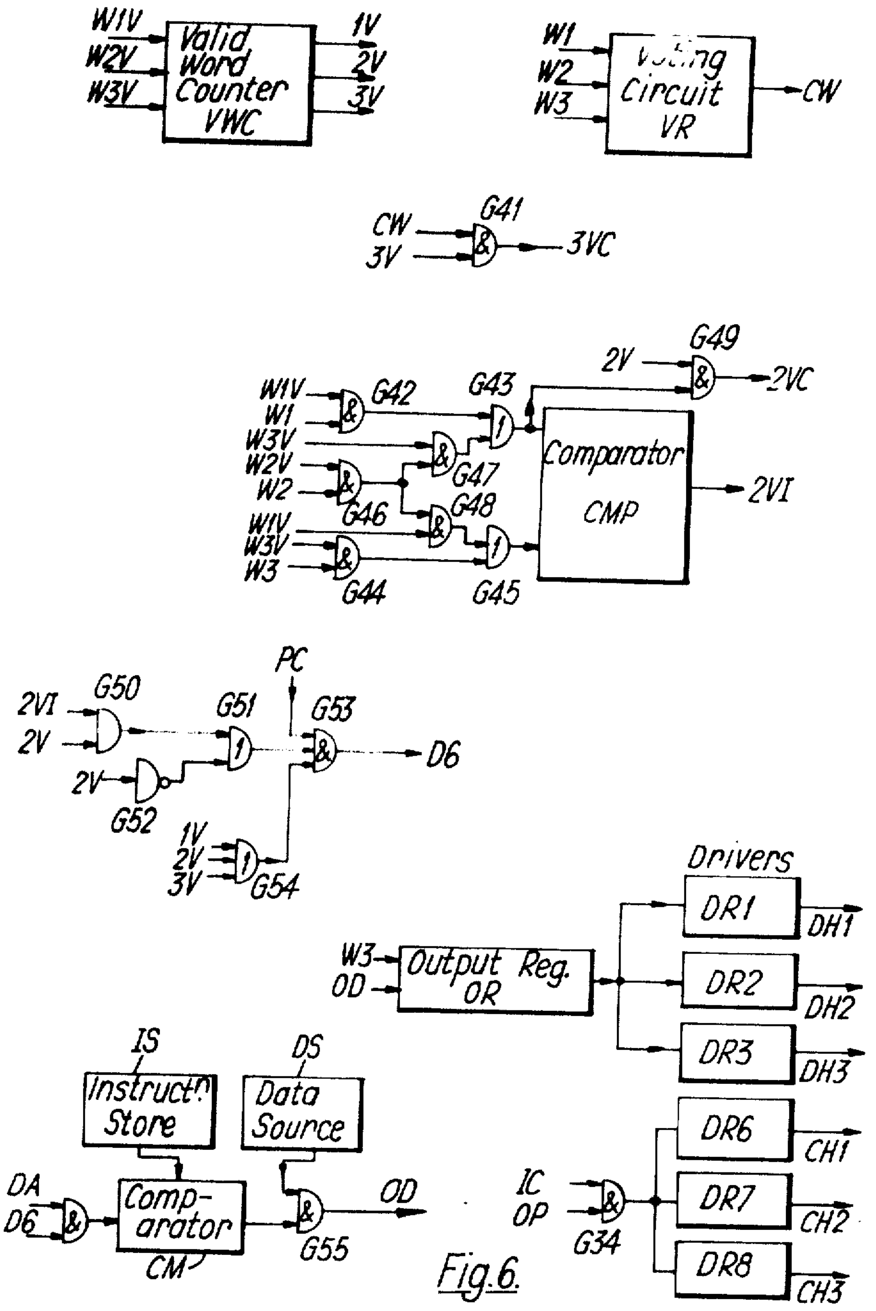

FIGS. 5 and 6 show, in schematic form the arrangement of a peripheral unit for checking and acting upon incoming control instructions. As shown, signals are received from each clock and data highway via receivers R1 to R6. The signals from the data receivers R2, R4 and R6 are applied to one input of each of three inhibit gates G22, G24 and G26 respectively, and hence to the data inputs of three input registers IR1, IR2 and IR3. The signals from the clock receivers R1, R3 and R5 are connected via inhibit gates G21, G23 and G25 to OR-gates G27, G28 and G29 respectively. The outputs of these gates are connected to the clock inputs to registers IR1, IR2 and IR3. The other input to each OR gate G27, G28 and G29 is derived from a two-input AND gate G30 having internally-generated clock pulses IC and a control signal CC applied to its inputs.

The outputs of the three clock inhibit gates G21, G23 and G25 are connected also to separate counters CT1, CT2 and CT3 respectively. The outputs of the three counters are applied as inputs to an AND gate G31 and an OR gate G32. The output of the gate G31 is connected to one input of OR gate G33, whilst the output of gate G32 is connected to the other input of gate G33 via a delay device DL. The output of gate G33 is the inhibit signal IH which is applied to inhibit gates G31 and G36.

Input register IR3 differs from the other two registers in that the output from the inhibit gate G36 is not applied directly to the register, but forms one input of an OR gate G34. The othe input to the OR gate is obtained from a gating network to be detailed below. Also clock input gate G39 has a further input OP.

Each of the input registers is arranged to provide two outputs as appropriate. Register IR1 produces an output W1V indicating that the word (or instruction) applied to the store is valid, i.e., has the correct number of bits, and also an output W1 on which the word may be clocked out. Similarly register IR2 has two outputs W2V and W2, and register IR3 has two outputs W3V and W3. These outputs are connected to the gating network referred to above, as shown. AND gate G35 has applied to it the W1V and W1 inputs, AND gate G36 has applied to it inputs W2V and W2, whilst AND gate G37 has its inputs W3V and W3. The outputs of gates G35, G36 and G37 are applied to OR gate G38. The output of this forms one input of AND gate G39, and the output of G39 forms one input of OR gate G40. The output of G40 is applied to OR gate G34 as already stated, and also to a parity check circuit PC.

The logic shown schematically in FIG. 6 is shown with detached connections for simplicity.

The validity outputs W1V, W2V and W3V of the three input registers are applied to a valid word counter VWC which gives an output depending upon the number of valid words in the registers. The "one-word valid" output 1V is applied to gate G39. The words themselves may, when required, be applied to a voting circuit VR which determines, bit by bit, which of the alternative bits to use on a majority basis. The output is a composite word CW (unless only one word is present in the registers or all words are identical, as they should be). The composite word output CW is gated with the three words valid signal 3V in gate G41 to give an output 3VC which is applied to gate G40.

The main logic arrangement remaining is the comparator CMP which checks on the equivalence of the words used. AND gate G42 has applied to it the W1V and W1 inputs from register IR1 and has its output connected via OR gate G43 to one input A of the comparator. Similarly AND gate G44 has the inputs W3V and W3 from register IR3, and has its output connected via OR gate G45 to the other input B of the comparator. An AND gate G46 has the equivalent signals W2V and W2 from register IR2 applied to it, and has its output connected to two further two-input AND gates G47 and G48. Gate G47 has the W3V signal applied to its other input and has its output connected to the OR gate G43. Similarly gate G48 has the W1V signal applied to its other input and has its output connected to OR gate G45. The output of gate G43 is connected also to AND gate G49 having as its other input the signal 2V. The output of G49 is a signal 2VC, applied to gate G40. Also shown in FIG. 6 are the final stages of a data source peripheral unit, that is one which sends data out to the highway.

In each case an instruction store IS contains all the instructions to which the particular peripheral unit should respond (and, if necessary the nature of the response). A comparator CM has connected to it both the store IS and the instruction output DA from the register IR3, the latter via an AND gate to which the DG signal is applied. The output from the comparator controls a gate G55 through which the data OD from a data source DS passes to the output register OR.

The data sink type of peripheral unit is exactly the same except that gate G55 controls the input of data from the highway into the data sink.

A further set of gates shown in FIG. 6 is intended to instruct the peripheral unit as to the state of the final checked instruction. An AND gate G50 has as its two inputs the signal 2V from the valid word counter VWC and the signal 2VI from the comparator CMP. The output of G50 is applied to an OR gate G51 together with the output of an invertor gate G52 having the 2V signal applied to it. The output of G51 forms one input of AND gate G53, together with the parity correct signal PC from the parity check circuit, and the output of OR gate G54. This latter gate has applied to it the three signals 1V, 2V and 3V from the valid word counter VNC.

FIG. 6 shows also the means for returning an instruction to the highway controllers from a source peripheral unit.

The contents of register IR3 which exist after the checking procedure is read into an output register OR and hence through drive circuits DR1 to DR3 to the three data highways. At the same time the internal clock pulses IC are gated by gate G34 with an output instruction and passed through drive circuits DR4 to DR6 on to the clock highways.

All of the logic shown, with the exception of the data source on sink and the output register form the checking means of the peripheral unit.

The operation of the peripheral unit is as follows:

A word (or instruction) is read into each input register under the control of the clock pulses on the clock highways. When each word is complete the appropriate counter CT delivers an output. Each counter output starts the delay device DL which, after a predetermined time interval will prode the inhibit signal IH from gate G33 and prevent further data from entering all the input registers. Alternatively, if all three input instructions are completely received before the expiry of the time delay, the same inhibit signal will be produced via gates G31 and G33. A checking cycle is now carried out.

If, as should ideally be the case, all three instructions are complete and identical, outputs W1V, W2V will all be present. The valid word counter VWC will thus produce an output 3V. The three instructions are then read by an internal clock IC and cycle check signal CC applied via gate G30 and gates G27,G28 and G29 to the three registers. The words pass bit by bit through the voting circuit VR to produce a single instruction CW. In the present case this will be identical with the three-received instructions. At the same time the three instructions are read into the comparator CMP. Since three words are valid the 3V signal is applied to gates G47 and G48. These enable word W2 to pass via gate G46 to each of the inputs of the comparator, the 2VI output from which indicates that the two words are identical. The 2VC output from G49 is not present since three valid words give rise to the signal 3V, not 2V, from the valid word counter.

The three words valid signal 3V enables the composite word CW to pass through gate G41 to OR gate G40 and hence into the input register IR3. At the same time the parity of the word is checked by the parity check circuit PC. The word is available as the data output DA from register IR3.

The absence of the 2V signal to gate G51 and the presence of the 3V signal at gate G53 enables gate G52 to open if the parity correct signal PC is present. The output of G52 indicates "data good" and informs the peripheral unit that the instruction may be acted upon. This signal allows gate G54 to pass the instruction output DA from the register IR3 to the comparator CM, where it is compared with the list of instructions to which the peripheral unit should respond. If there is agreement, the output from the comparator opens gate G55 and allows data from a data source DS to pass to the output register OR for subsequent transmission over the highways. The data is preceded by the accepted instruction which was stored in register IR3 and has been clocked into the output register by the OP signal applied to gate G29. At the same time as the instruction plus data is clocked out on to the data highways a train of internal clock pulses is sent out over the clock highways via gate G34.

The above description has assumed that the ideal situation existed in which all three data highways carried the same valid control instruction. Even if these differ slightly the procedure will be the same since the voting circuit VR will produce a composite word.

It is now necessary to consider the situation which exits when only two of the words are valid, say words W1 and W2. In this case the valid word counter will produce an output 2V. The three words, or two words and part of the third, will still pass through the voting circuit to produce a composite word, but this will not be used since the 3V signal is absent from gate G41.

In the conditions assumed above word W1 is passed through gate G42 by the signal W1V to input A of the comparator, whilst word W2 is passed through gate G46 by the signal W2V and through G48 by the W1V signal to output B of the comparator. Gate G49 will produce an instruction 2VC since both of its inputs are present. If the words applied to the comparator are identical the 2VI signal will denote this. The instruction 2VC from G49 will pass through gate G40 as before into register IR3.

The 2VI signal from the comparator activates gates G49 to G53 as before to give the DG signal. If, of course, the two words applied to the comparator are not identical, then although word W1 is written into register IR3, the word will not be used by the peripheral unit.

If the two valid words had been W2 and W3, then the same sequence as above would be followed except that word W2 would be applied to input A of the comparator and word W3 to input B. word W2 would then be written into register IR3.

Similarly if the valid words were W1 and W3, word W1 would be applied to input A of the comparator and into register IR3, whilst word W3 would be applied to input B of the comparator.

The final possible situation is that only one of the three instructions is valid. In this case the valid word counter VWC will deliver the 1V signal. As in the previous example the voting circuit output will not be used. Also, in this case, there will be no output from the comparator, since an input will be applied to one only of its two inputs, depending upon which is the valid instruction. The input to register IR3 is now determined by the gating network comprising gates G35 to G40. The valid word passes through one of the gates G35 to G37 and through OR gate G38. The presence of the 1V signal at gate G39 enables the valid word to pass through this gate and gates G40 and G34 into register IR3. As before, the parity is checked and, if correct, the PC signal is applied to gate G53. G51 is activated by the absence of the 2V signal on gate G52, and G54 is activated by the 1V signal. Hence gate G53 delivers a D6 signal to allow the peripheral unit to accept and act upon the instructions now contained in register IR3.

The checking sequence described in detail above is carried out at every peripheral unit. As already stated, a source peripheral unit will send the accepted instruction back along all data highways before transmitting its data. Not only does this enable the highway controllers to maintain synchronisation in the manner described earlier, but this also prepares the appropriate data sink peripheral units, that is those units which use the data to be transmitted by the source unit. Examples of sink peripheral units are an output transducer or a computer, the latter itself acting as a source at some other time.

A data transfer system of the type described may utilise any number of highways from two upwards, so long as the required interconnections are provided between highway controllers and peripheral units. A system of this type is intended primarily for use in situations where damage might affect peripheral units, highways or highway controllers. The system also has the advantage that a controller or highway may be withdrawn from service whilst the system is operating without affecting the system.

What we claim is:

1. A data transfer system having a plurality of peripheral units any one of which may be required to transmit data to or receive data from other such units in response to a designated control instruction, comprising at least two independent two-way data highways, means connecting each peripheral unit to each data highway, a separate controller for each data highway operable to transmit over its highway to all peripheral units a sequence of control instructions identical to the sequence transmitted by each other controller, checking means associated with each peripheral unit to check the control instruction received over each highway and including a control instruction selector operable to select one of the simultaneously-received designated control instructions and activate the peripheral unit in response to a selected one of the control instructions, means associated with each data-transmitting peripheral unit to re-transmit the selected designated control instruction over each highway to each controller, and synchronizing means included in each controller responsive to the re-transmitted instruction to maintain the sequence of control instructions transmitted by the controller in synchronism with the sequence transmitted by each other controller.

2. A system as claimed in claim 1 wherein said control instruction selector includes means for checking that the selected control instruction is one to which the peripheral unit should respond.

3. A system as claimed in claim 1 in which the checking means further includes an instruction store containing all control instructions to which the peripheral unit should respond, and a comparator operable to compare the selected control instruction with the stored instructions to allow the peripheral unit to respond only when the two instructions applied to the comparator are in agreement.

4. A system as claimed in claim 3 in which the peripheral unit includes a data source operable to originate data to be applied to the data highways, an output register connected to all of the data highways and arranged to receive the data from the data source, gating means controlled by the comparator to control the application of data from the data source to the output register, and means for applying the selected control instruction to said output register.

5. A system as claimed in claim 4 including means for re-transmitting the control instruction which activated the peripheral unit to each highway controller before the transmission of the relevant data to other peripheral units in response to that control instruction.

6. A system as claimed in claim 3 in which the peripheral unit includes a receiving register connected to all of said data highways, a data sink operable to use data applied to the highways, and gating means controlled by the comparator to apply data from the receiving register to the data sink.

7. A system as claimed in claim 1 in which each highway controller includes a control instruction generator operable to generate the required sequence of control instructions and to apply these to the data highway and to the synchronising means.

8. A system as claimed in claim 7 in which the synchronising means includes a highway instruction register to which each out-going control instruction is applied, an incoming register to which each control instruction re-transmitted by a peripheral unit is applied, and a comparator operable to compare the said two control instructions, and means for inhibiting the operation of the control instruction generator when the two compared instructions are not identical.

9. A system as claimed in claim 8 including means for applying the output of the comparator to a control unit which controls the operation of the control instruction generator.

10. A system as claimed in claim 7 including a clock pulse generator for transmitting clock pulses by each highway controller to all peripheral units.

11. A system as claimed in claim 10 including a separate clock highway connected to each highway controller, each peripheral unit being connected to all clock highways.

12. A system as claimed in claim 2 in which the checking means further includes an instruction store containing all control instructions to which the peripheral unit should respond, and a comparator operable to compare the selected control instruction with the stored instructions to allow the peripheral unit to respond only when the two instructions applied to the comparator are in agreement, said peripheral unit including a data source operable to originate data to be applied to the data highways, an output register connected to all of the data highways and arranged to receive the data from the data source, gating means controlled by the comparator to control the application of data from the data source to the output register, and means for applying the selected control instruction to said output register, means for transmitting the control instruction which activated the peripheral unit to each highway controller before the transmission of the relevant data to other peripheral units in response to that control instruction and each high controller including a control instruction generator operable to generate the required sequence of control instructions and to apply these to the data highway and to the synchronising means.

13. A system as claimed in claim 12 in which the synchronising means includes a highway instruction register to which each out-going control instruction is applied, an incoming register to which each control instruction re-transmitted by a peripheral unit is applied, and a comparator operable to compare the said two control instructions, the operation of the control instruction generator being inhibited when the two compared instructions are not identical.

14. A system as claimed in claim 13 including means for applying the output of the comparator to a control unit which controls the operation of the control instruction generator.

15. A system as claimed in claim 14 including a clock pulse generator for transmitting clock pulses by each highway controller to all peripheral units.

16. A system as claimed in claim 15 including a separate clock highway connected to each highway controller, each peripheral unit being connected to all clock highways.

17. A system as claimed in claim 12 in which the peripheral unit includes a receiving register connected to all of said data highways, a data sink operable to use data applied to the highways, and gating means controlled by the comparator to apply data from the receiving register to the data sink.

18. A system as claimed in claim 12 including a clock pulse generator for transmitting clock pulses by each highway controller to all peripheral units.

19. A system as claimed in claim 18 including a separate clock highway connected to each highway controller, each peripheral unit being connected to all clock highways.

* * * * *

PO-1050
(5/69)

UNITED STATES PATENT OFFICE
CERTIFICATE OF CORRECTION

Patent No. 3,750,110 Dated July 31, 1973

Inventor(s) Martin et al.

It is certified that error appears in the above-identified patent and that said Letters Patent are hereby corrected as shown below:

On the front page, the format failed to include the priority information which should appear after line "[27]" as follows: [30] Foreign Application Priority Data November 25, 1970 Great Britain 56008/70; Claim 12, line 16, (column 11), "high" should read --highway--.

Signed and sealed this 25th day of December 1973.

(SEAL)
Attest:

EDWARD M.FLETCHER,JR.
Attesting Officer

RENE D. TEGTMEYER
Acting Commissioner of Patents